UNITED STATES PATENT OFFICE.

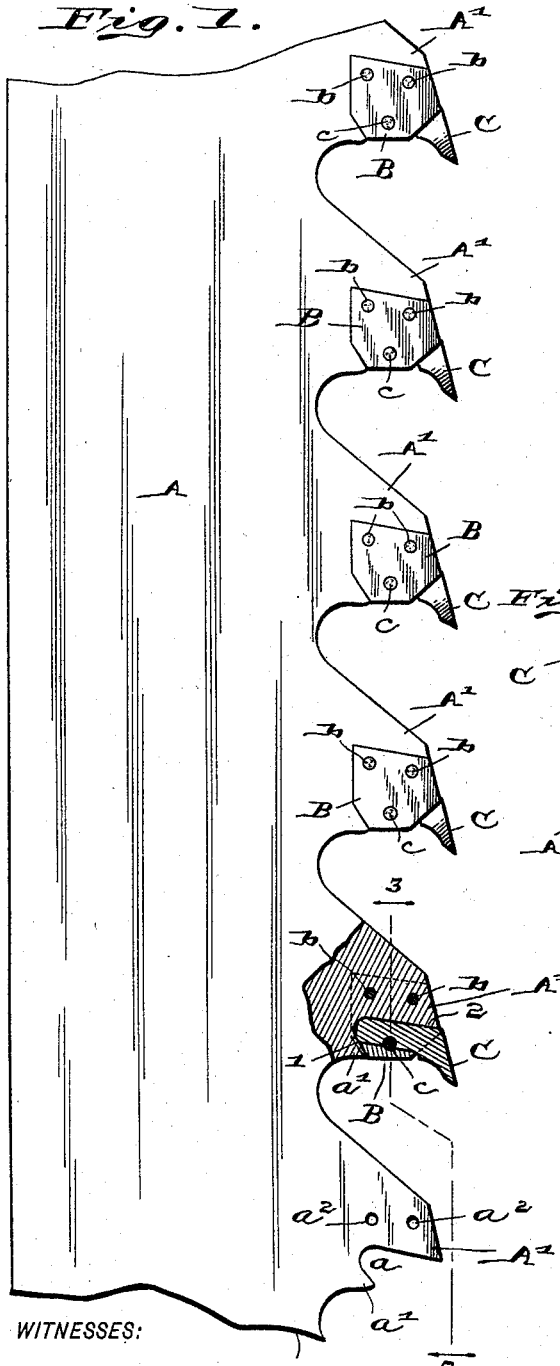

ANDREW KRIEGER, OF INDIANAPOLIS, INDIANA.

SAW.

SPECIFICATION forming part of Letters Patent No. 540,065, dated May 28, 1895.

Application filed March 5, 1895. Serial No. 540,578. (No model.)

*To all whom it may concern:*

Be it known that I, ANDREW KRIEGER, a citizen of the United States, residing at Indianapolis, in the county of Marion and State of Indiana, have invented certain new and useful Improvements in Saws, of which the following is a specification.

The object of my said invention is to provide a cheap and easily manipulated but efficient construction and arrangement of saw teeth, which, while applicable to many classes of saws, is especially designed for those with comparatively thin blades, and those which have their teeth closer together than in cases where insertible saw teeth have commonly been used; and said invention consists in the peculiar construction and arrangement of the various parts, whereby various advantages are attained, as will be hereinafter more particularly described and claimed.

Referring to the accompanying drawings, which are made a part hereof, and on which similar letters and numerals of reference indicate similar parts, Figure 1 is a side elevation of a fragment of a saw provided with teeth constructed and applied in accordance with my said invention, one of said teeth and the adjacent portions of the saw-blade being shown in section at one point, and the saw-blade being shown ready for the application of the tooth and socket at another point; Fig. 2, a front edge elevation of a fragment of the saw in Fig. 1; Fig. 3, a detail sectional view as seen from the dotted line 3 3 in Fig. 1, and Fig. 4 a detail transverse sectional view looking upwardly from the dotted line 4 4 in Fig. 2.

In said drawings the portions marked A represent the saw blade; B, a socket piece secured to said blade, and C the saw teeth.

The saw blade A is notched on its front or cutting edge, in large part similar to the usual form of solid teeth, forming projections A', and portions of these projections, or what would otherwise be the teeth, in a solid tooth saw, are cut away, leaving recesses $a$ into which the lower ends of the insertible teeth C will be inserted, while the resulting projections $a'$, alongside said recesses, receive a part of the strain upon said inserted teeth. Holes $a^2$ are formed in the projections A' of the saw blade to receive rivets connecting the holders or socket-pieces B thereto, as will be presently described.

The socket-pieces or tooth-holders B are substantially U-shaped devices, with the bottom of the U forming the throat under the point of the tooth, in use. Its sides extend up alongside the projecting portion of the saw, and are secured thereto by rivets C extending through the holes $a^2$. This, as will be readily seen, forms a socket, between the space of the projecting portion of the saw blade and the bottom of the part B, into which the shank of the tooth C is inserted, as shown most plainly in the sectional portion of Fig. 1. These socket-pieces might be secured in place by solder, or by brazing, instead of by rivets, if desired, or the two methods may be combined, without departing from my invention; and the sides of the projections A' of the saw may be scarfed in somewhat, if desired, although, except with thick saws, this will not ordinarily be desirable.

The tooth C is a plain simple cutting tooth with a chisel point and a plain shank which extends down into the socket which has been described. A semi-circular recess is cut in the front side of its shank to receive the pin $c$, by which the tooth is held in position. Each tooth, when in position, as shown, rests at the point 1 against the projection $a'$ on the saw blade, and at the point 2 rests against the extended larger projecting portion of the saw blade, and thus the saw blade itself receives a large portion of the force of the sawing operation, so that the holder, the rivets, and the pin, are called upon to carry but a comparatively small strain. The teeth themselves being small, simple, and consequently very inexpensive, they can be rapidly removed and renewed as they are worn out, at slight cost, while the saw retains its full original size and width, and, what is of great importance, the original tension is maintained.

Having thus fully described my said invention, what I claim as new, and desire to secure by Letters Patent, is—

1. The combination of a saw having projections, socket pieces or tooth holders embracing said projections, with sockets between the adjacent surfaces of said projections and said tooth holders, and teeth having shanks adapted to be inserted in the sockets formed by the embracing sides of the tooth holders and the adjacent edges of the projections on the saw plate.

2. The combination of a saw plate having projections, detachable tooth holders embracing said projections whereby sockets are formed parallel on all sides, and tooth points having shanks also parallel on all sides and adapted to be inserted in said sockets, and thus supported by the projections on the saw plate at the back, and by the tooth holders on the remaining sides, substantially as set forth.

3. The combination, with a saw having projections A', of the U-shaped socket-pieces or tooth-holders B secured to said projections, and the teeth C having shanks adapted to fit into the sockets so formed, with notches in said shanks, holes through the socket-pieces registering with said notches, and pins or rivets adapted to be inserted in said holes and thus hold the teeth in position.

4. The combination, with a saw having projections A', and other and smaller projections a' below said main projections, with notches or concavities between the larger and smaller projections, of socket-pieces or tooth holders secured to the larger projections and above the smaller, and teeth having shanks adapted to enter the socket so formed, and engage at the lower ends with said smaller projections, and bear at the upper end against the face of the larger projections, substantially as shown and described.

5. The combination, with a saw having projections thereon, of U-shaped socket-pieces or tooth-holders adapted to embrace said projections, the opening wherein is equal to the thickness of the saw plate, and teeth the shanks whereof are substantially the same thickness as the saw plate at the point where the teeth have their bearings thereon and adapted to be inserted in the socket formed by the inner sides of the tooth holders and the adjacent edges of the projections on the saw plate, and means for securing said teeth in said sockets, substantially as set forth.

In witness whereof I have hereunto set my hand and seal at Indianapolis, Indiana, this 2d day of March, A. D. 1895.

ANDREW KRIEGER. [L. S.]

Witnesses:
CHESTER BRADFORD,
JAMES A. WALSH.